United States Patent [19]

Yoshida et al.

[11] Patent Number: 4,566,088
[45] Date of Patent: Jan. 21, 1986

[54] OPTICAL AND REVERSIBLE RECORDING AND REPRODUCING APPARATUS

[75] Inventors: Tomio Yoshida, Katano; Isao Satoh, Neyagawa; Shunji Ohara, Higashiosaka; Kenji Koishi, Hyogo; Yuzuru Kuroki, Moriguchi, all of Japan

[73] Assignee: Matsushita Electric Industrial Co., Ltd., Osaka, Japan

[21] Appl. No.: 542,014

[22] Filed: Oct. 12, 1983

[30] Foreign Application Priority Data

Oct. 14, 1982 [JP] Japan .................. 57-179086

[51] Int. Cl.⁴ .............................. G11B 7/00
[52] U.S. Cl. ........................ 369/44; 346/76 L; 365/113; 369/111; 369/116; 369/122; 369/275
[58] Field of Search ............... 358/342; 365/113; 369/100, 109, 110, 111, 112, 116, 121, 122, 275, 44; 346/76 L

[56] References Cited

U.S. PATENT DOCUMENTS 4,264,986 4/1981 Willis ..................... 369/275
4,383,261 5/1983 Goldberg ................. 346/76 L
4,403,318 9/1983 Nagashima et al. ........... 369/100

Primary Examiner—Donald McElheny, Jr.
Attorney, Agent, or Firm—Spencer & Frank

[57] ABSTRACT

An optical and reversible recording and reproducing apparatus providing a practical apparatus in which information signals can be recorded, reproduced and erased by irradiating a laser beam and the like on the substrate to be optically recorded. More practically, there is provided such an apparatus wherein two light sources such as lasers having different wavelengths are used, and a first almost circular micro-lightspot is produced by one light source, while a second elliptic light spot having a longitudinal diameter in the tangential direction of a guide track on a disc is produced by the other light source. These first and second light spots are closely irradiated on one and the same guide track of an optical recording disc. The recording and reproducing of the signals are performed using the first light spot while the erasure of the recorded signals can be made by using the second light spot or using both first and second light spots in combination.

5 Claims, 12 Drawing Figures

OPTICAL AND REVERSIBLE RECORDING AND REPRODUCING APPARATUS

BACKGROUND OF THE INVENTION

This invention relates to an optical recording and reproducing apparatus and, more particularly, to an optical and reversible recording and reproducing apparatus in which a laser beam is converged to a micro-lightbeam having a diameter of about 1 μm by using a lens or the like and this micro-lightbeam is applied onto an optical recording medium to record and reproduce signals with high density and to erase the recorded signals, thereby permitting repetitional recording and reproducing of signals.

Conventionally, as one example of optical recording and reproducing apparatuses, an apparatus has been proposed and used in which signals are recorded and reproduced with high density by applying a laser beam and the like having the above-mentioned micor-beam diameter on an optical recording disc which is rotating. This kind of optical recording and reproducing apparatus is highlighted as an apparatus which can provide a new recording device and media for future society since it may deal with a large amount of information. The characteristics of apparatus of this kind which permit it to handle large amounts of information include that the recording density is high and, therefore, the memory cost per bit can be reduced since the access time is very short and since an optical head does not come into contact with the tracks of the optical recording disc so that the recording and reproducing can be stably performed.

As the above-mentioned method of optical recording and reproducing, the write-once type and the erasable type have been proposed. As a write-once type recording and reproducing method, there has been proposed a method of recording and reproducing signals in which the thin recording film on a recording disc is locally evaporated by the thermal energy of the laser to form small holes, and a method of recording and reproducing signals in which the optical density of the thin recording film is locally changed by the thermal energy of the laser beam, or the like. On the other hand, as an optical recording and reproducing apparatus of the erasable type, there has been proposed a method in which an optical magnetic recording material to record and reproduce signals in cooperation with the thermal effect of the laser and the external magnetic field is used, and a method in which with respect to the thin recording film a recording disc whose optical density is changed as mentioned above, the optical density is reversibly changed only by using the thermal energy of the laser. It is worth notice in view of such fact that the optical density can be reversibly changed, signals can be erasably recorded and reproduced on and from an optical recording medium.

As one proposed method of reversibly varying the density of the thin recording film, a transition between the amorphous state and the crystal state of the thin recording film, or a transition between one amorphous state and another stable amorphous state is repeatedly carried out. Additionally, there is also proposed a method in which a change in size of the crystal particles in an amorphous matrix is utilized.

Prior to description, it is assumed that the optical density change is obtained, utilizing a transition between the amorphous state and the crystal state for simplicity of description.

FIG. 1 shows a simplified model of the condition for transition between the amorphous state and the crystal state.

In FIG. 1, the amorphous state is indicated by a reference character (A), in which the reflection factor of the light of the thin recording film is small, while the transmission factor of the light is large. The crystal state is represented by (C), in which the reflection factor of the thin recording film is large, but the transmission factor is small. With this thin recording film in which the optical density can be reversibly changed, when the temperatuare of the thin recording film in the amorphous state (A) in FIG. 1 is locally raised up to near its melting point and its portion is slowly cooled, the relevant portion becomes the crystal state (C). On the other hand, when the temperature of the thin recording film in the crystal state is locally raised up to near its melting point and its portion is rapidly cooled, the corresponding portion becomes the amorphous state (A).

FIGS. 2a and 2b show examples of a method of realizing the condition to raise the temperature and cool rapidly and the condition to raise the temperature and cool slowly on the thin recording film.

FIG. 2a shows an almost circular micro spot L to be formed by the laser or the like on the recording medium which relatively moves in the direction indicated by an arrow. When the intensity of this light spot L is enlarged for only a short period of time to raise the temperature of a local portion of the thin film, the thermal energy due to this temperature elevation at this local portion will be rapidly diffused to the thin film and the suporting member of the thin film, thereby providing a rapid cooling condition. In contrast, as shown in FIG. 2b, when an elongated light spot M which extends in the moving direction (indicated by an arrow) of a recording medium is produced in the similar manner by the laser and the like on the recording medium and then the intensity of this light spot M is continuously or intermittently enlarged, the relevant portion of the thin recording film is heated over a wide area. Thus, this heated portion will be more slowly cooled than in the case of FIG. 2a. That is to say, the condition for temperature elevation and rapid cooling is obtained by applying the circular micro-beam on the thin recording film which relatively moves and time-modulates its intensity, thereby to produce the pulse-like light. On one hand, the condition for temperature elevation and slow cooling is obtained by applying the light beam which is elongated in the moving direction of the thin recording disc onto this thin recording film of the recording disc which relatively moves.

SUMMARY OF THE INVENTION

It is an object of the present invention to provide a novel optical and reversible recording and reproducing apparatus for allowing the optical characteristic of a thin optical recording film on a recording disc to be reversibly changed using the thermal phenomenon with the use of the laser beam or the like, in which a first light spot to provide the above-mentioned condition for temperature elevation and rapid cooling and a second light spot to provide the condition for temperature elevation and slow cooling are formed by the same diaphragm lens, and both spots are closely arranged on the same guide track in a disc, and in which by controlling the intensities of both light spots as necessary, signals can be erasably recorded on and reproduced from the optical recording film.

A more specific object of the present invention is to provide such a novel apparatus in which a substantially circular light spot, as the above-mentioned first light spot, and an eliptic light spot, as the above-mentioned second spot, having a different wave length from that of the first light and elongated along the guide track are closely arranged on the same guide track in the optical disc using the same diaphragm lens, and in which signals can be recorded and reproduced, using the first light spot and the already recorded signals can be erased by providing the condition for temperature elevation and slow cooling for the thin recording film using solely the second light spot or cooperatively using both first and second light spots.

A further object of the invention is to provide such a novel apparatus in which the format information recorded on the optical recording disc is read out and the interval to be erased on the optical recording disc, i.e. the erasing region is detected and fixed by the first light spot, and in which the erasing light constituted by the second light spot and the like can irradiate on only the specific interval to be read out by the first light spot.

DESCRIPTION OF THE PREFERRED EMBODIMENT

A practical embodiment of an optical and reversible recording and reproducing apparatus according to the invention will be described hereinbelow with reference to the drawings.

Figure 1:
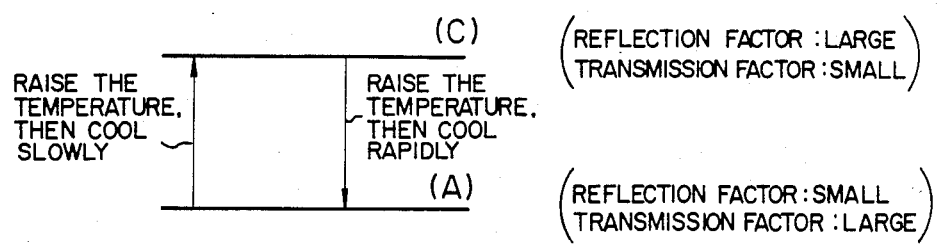
FIG. 1 is a diagram showing one example of the operational principle of an optical recording thin film material which enables the optical density to be reversibly changed.
Figure 2A:
FIGS. 2a and 2b are diagrams showing the forms of the light beam to be applied onto the thin recording material and the condition for temperature elevation and rapid cooling and the condition for temperature elevation and slow cooling in the thin film.
Figure 2B:
Figure 3:
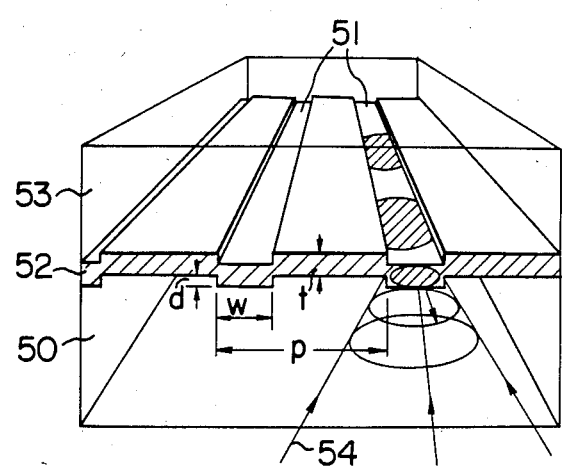
FIG. 3 is a diagram illustrating an example of the construction of the optical recording disc having grooves as optical guide tracks to be used in one embodiment of the present invention.

FIG. 3 is a cross sectional view in the radial direction of an optical recording disc having guide tracks (pregrooved disc) to be used for the present invention. In this embodiment, as an example of the guide track, there is shown an optical pregrooved disc having grooves in the entire surface of the signal recording area on the disc.

In FIG. 3, a disc substrate 50 is made of a transparent material, on which groves 51 each having a width w, depth d and track pitch p are formed spirally or coaxially. A thin recording film 52 having a thickness t is formed by the metal evaporating process or other process on the disc substrate 50. A protective layer 53 is further formed on this film 52.

The width w of each of the grooves 51 is smaller than the diameter of a laser beam 54 to be irradiated. The depth d of each groove is selected to be such a value that when the center of the optical axis deviates from the center of the groove, the diffraction effects due to the groove in the far-field pattern of the reflected light become asymmetric with respect to the optical axis. More specifically, when the wavelength of the laser beam to be applied is $\lambda$, its depth d is set to approximately $\lambda/6$ to $\lambda/12$.

Such grooves serve as guide tracks which can be optically detected by means of the laser light 54 applied thereto. Namely, by detecting the asymmetry of the far-field pattern of the reflected light, a well-known tracking servo can be applied. Therefore, the applied light 54 of FIG. 3 can record or reproduce signals along a specific groove.

Although the grooves 51 shown in FIG. 3 have been described as one example of the guide tracks, several other processes for guiding the recording and reproducing light beam ar known as the guide tracks. However, they are omitted here since they are not directly relevant to this invention.

Figure 4:
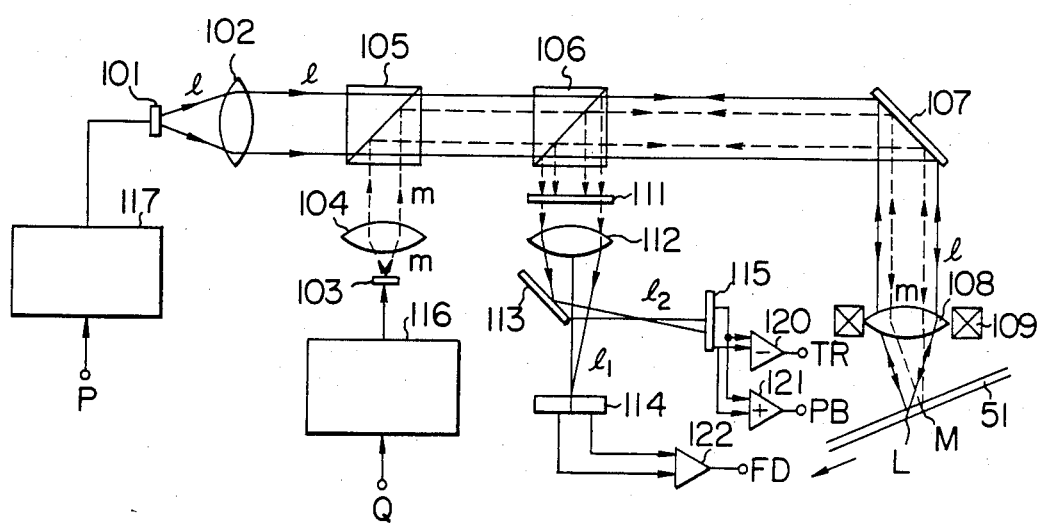
FIG. 4 shows an entire constructional diagram in one embodiment of the present invention.

FIG. 4 shows one embodiment of the present invention.

FIG. 4, a semiconductor laser 101 generates light having a wavelength $\lambda_1$ and its output light beam is indicated by l. A reference numeral 102 denotes a condenser lens for condensing the spreading output light of the semiconductor laser as as to obtain a substantially parallel light beam. A numeral 105 represents a light beam synthesizer for allowing the light having a wavelength $\lambda_1$ to be transmitted and for reflecting the light having a wavelength $\lambda_2$ which will be described later, while numeral 106 denotes a beam splitter. A numeral 107 denotes a reflective mirror. The light beam l of the semiconductor laser 101 passes through these optical elements and enters a diaphragm lens 108. The diaphragm lens 108 acts to converge the incident light beam l to produce substantially circular light spot L on the groove 51 which serves as the guide track. A numeral 109 indicates an actuator to drive the diaphragm lens 108. This actuator drives the diaphragm lens in the direction of the optical axis in accordance with the surface oscillation of the disc, thereby performing a known focusing control. The actuator also drives the diaphragm lens 108 in the direction perpendicular to the incident optical axis and to the guide track to perform a known tracking control against the guide track which inherently has eccentricity. If necessary, the actuator drives the diaphragm lens in the tangential direction of the guide track, thereby to perform the control in the direction of the time base.

Referring to FIG. 4 again, a reference numeral 103 denotes a semiconductor laser for generating a light beam m having a wavelength $\lambda_2$, and 104 indicates a condenser lens. The light beam m is reflected by the beam synthesizer 105 and passes through substantially the same light passageway as that of the light beam l and enters the diaphragm lens 108, so that a substantially elliptic or hyperelliptic light spot M whose longitudinal direction coincides with the longitudinal direction of the groove 51 is formed on the same groove 51 as in the case of the light spot L. The method of formation and its effect on the above-mentioned elliptic light spot M will be described later with reference to FIGS. 5a, 5b, 6a, 6b, and 7.

The light beam reflected by the optical recording disc passes through the diaphragm lens 108 and mirror 107 and enters the beam splitter 106 and then is reflected by the beam splitter 106 and thereafter enters filter plate 111. In this case, only the light having the wavelength $\lambda_1$ is transmitted, but the light having the wavelength $\lambda_2$ is not transmitted. A single lens 112 converts the reflected light beam l into the condensed light. A reflective mirror 113 serves to interrupt one half of the light condensed by the single lens 112 and serves as a reflective mirror. A numeral 114 represents two-split photo diodes for detecting a focusing error signal. These diodes are disposed on the focal point of the single lens 112 and detect a conventionally known focusing error signal in response to the split light $l_1$. A numeral 115 shows two-split photo diodes to detect a tracking error signal. These diodes detect a tracking error signal due to the light $l_2$ reflected by the mirror 113. The reproduction signals of the signals recorded on the grooves 51 of the disc are obtained by means of the photo detector 114 or 115.

A circuit 116 drives the laser 103 and controls the intensity of the elliptic light spot M formed on the groove 51.

A circuit 117 drives the laser 101 and controls the intensity of the light spot L formed on the groove 51.

An amplifier 120 is a circuit to amplify a signal indicative of the difference between the outputs generated from each element of the split photo diodes 115 and generates the tracking error signal at its terminal TR. An amplifier 121 is a circuit to amplify a signal representative of the sum of each output of the photo diodes 115 and outputs the reproduction signal and the like at its terminal PB. A reference numeral 122 indicates a circuit to amplify a difference signal between each element of the split photo diodes 114 and this amplifier outputs the focusing error signal at its terminal FD.

With such a construction, two light spots are closely formed on the same guide track, in which one light spot is substantially circular and the other light spot is elliptic which extends along the guide track. These lights have desired intensities or desired signals and are irradiated on the thin recording film while tracking the guide track of the optical recording disc.

Figure 5A:
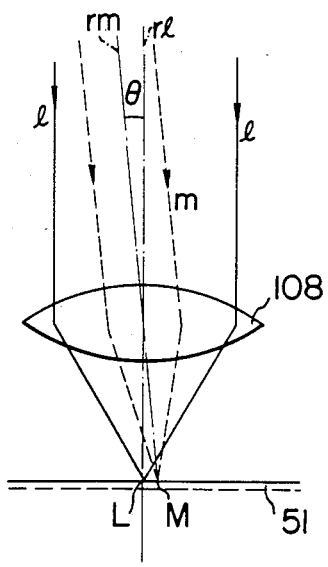
FIGS. 5a and 5b are diagrams showing a method of incidence of a light beam into a diaphragm lens when an almost circular micro light spot and an elliptic light spot having a longitudinal diameter in the tangential direction of the guide track are formed on the disc.
Figure 5B:
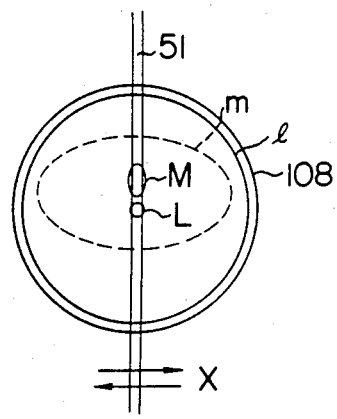

Referring now to FIGS. 5a and 5b, there is shown an example of incident process of the light into the diaphragm lens 108 in the cases where the circular micro light spot L and an elliptic light spot M are formed on the groove 51. FIG. 5a shows a process of incidence of the light into the diaphragm lens in the cross section perpendicular to the guide groove 51 and in the tangential direction of the guide groove 51. FIG. 5b is a plan view as viewed from the incident surface of the diaphragm lens 108. The same elements and components as those in FIG. 4 are designated by the same reference numerals and characters.

In FIG. 5a, a reference character $r_l$ denotes the optical axes of the light beam l and the diaphragm lens 108 and $r_m$ indicates the optical axis of the light beam m. As illustrated in the drawings, by slightly inclining the optical axis of the light beam m by an angle $\theta$ with respect to the tangential direction of the groove 51, the light spots L and M can be formed closely in the locations on the groove 51. In the plan view of FIG. 5b, the light beam l enters the full aperture of the diaphragm lens 108, thereby to form the substantially circular light spot L on the groove 51. To the contrary, although the light beam m uses the whole aperture of the diaphragm lens 108 in the direction perpendicular to the grove 51, it uses only part of the aperture of the diaphragm lens 108 in the tangential direction of the groove 51. In this way, the elliptic light enters, so that it is possible to form the hyperelliptic light spot M which is thin in the direction of the groove width and is long in the tangential direction of the groove on the groove 51.

An arrow X represents the oscillation direction of the diaphragm lens 108 in the case where the light spots L and M are allowed to trace the groove 51.

Figure 6A:
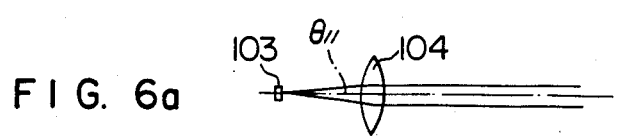
FIGS. 6a and 6b are diagrams showing the mutual relation between a semiconductor laser and a condenser lens when forming an elliptic light on the disc.
Figure 6B:
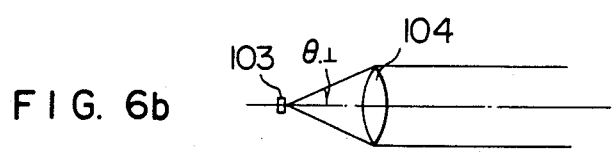

FIGS. 6a and 6b show an example of the process of forming the elliptic light beam m shown in FIG. 5b. The same components as those in FIG. 4 are designated by the same reference numerals.

Generally, the semiconductor laser 103 has different angles of divergence of the light beam with respect to the direction perpendicular ($\perp$) to and the direction parallel ($\parallel$) to the junction surface, these values are determined at the time of designing the junction surface. In FIGS. 6a and 6b, the angle of divergence in the direction parallel to the junction surface is indicates by $\theta_\parallel$, while the angle of divergence in the direction perpendicular thereto is represented by $\theta_\perp$. Therefore, as shown in the drawings, the light beam having an elliptic light cross-section can be formed by arranging the condenser lens 104 in such a manner that the entire aperture is used in the direction $\theta_\perp$ and only part of the aperture is used in the direction of $\theta_\parallel$.

Figure 7:
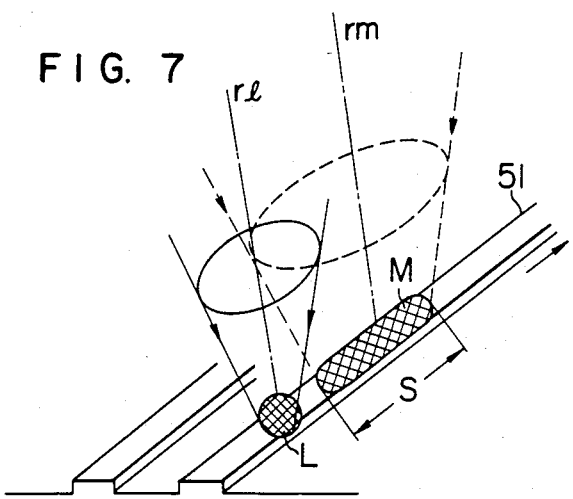
FIG. 7 is a diagram showing the mutual functions of the almost circular light beam and elliptical light bean formed on the same guide track.

FIG. 7 illustrates practical examples of the light spots L and M formed closely on the same guide track in the construction of FIG. 4.

The light spot L is an almost circular micro-lightspot having a wavelength $\lambda_1$ and is used to record and reproduce signals on the guide tracks. This light spot L is also used to detect control signals for the focal control, tracking control, etc. On the other hand, the light spot M having a major diameter in the tangential direction of the guide track has a wavelength different from that of the light spot L and serves as the light spot to erase the signals which have been preliminarily recorded on the tracks without affecting the recording and reproducing of the signals by the light spot L. Namely, this erasing lightspot M is simply utilized to supply the energy to the disc only when one wishes to erase desired information or for only the interval on the disc on which the information to be erased has been recorded. Thus, the semiconductor laser 103 of FIG. 4 to produce this erasing light spot M is emitted only when one wishes to erase and does not need to be emitted in other cases. That is, only the lightspot L may be used in the ordinary mode of recording and reproducing the signals.

To erase the signals which have been prerecorded using the lightspot M, as described above, it is suitable to apply the lightspot M as the light power which is continuous in the time base to the thin recording film in a section where the signals to be erased are recorded, so that the condition for temperature elevation and slow cooling is effected on the thin recording film.

Figure 8:
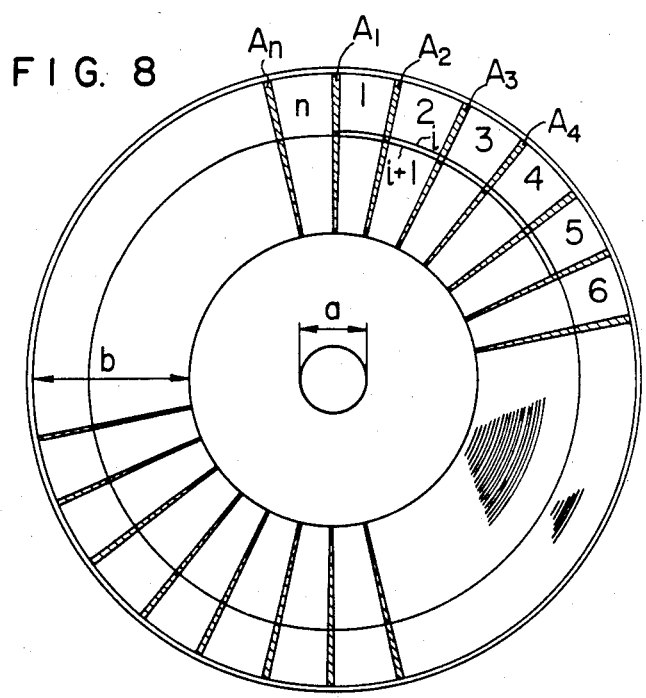
FIG. 8 is a schematic diagram showing an example of the optical recording disc which has been performed.
Figure 9:
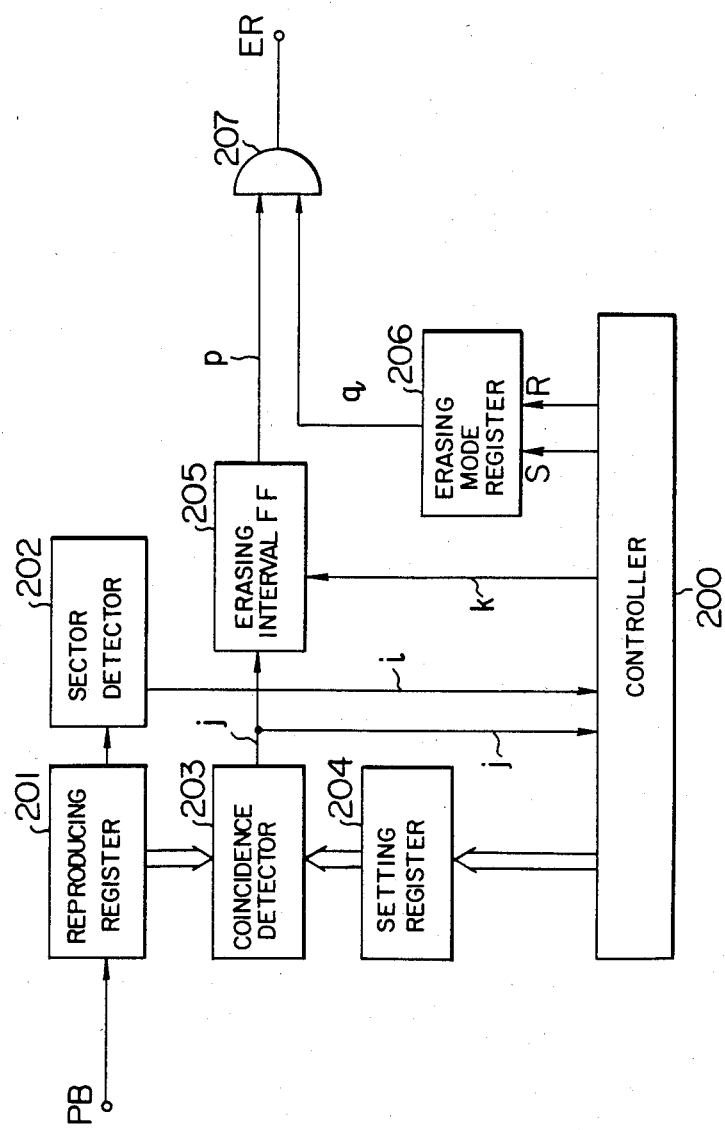
FIG. 9 shows an example of a circuit for controlling the light emission of the erasing light.

FIG. 8 shows an example of the format of the optical recording disc to be used in the present invention. In FIG. 8, a reference character a denotes a center hole and b indicates an information recording area. Characters i and i+1 show grooves formed in the information recording area of the disc, in this case they denote the (i)th and (i+1)th grooves (tracks). Characters $A_1$, $A_2$, ---, $A_n$ represent areas in which track address signals which are peculiar to each groove and sector address signals have been recorded as pitlike signals, wherein one track (grooves) is divided into a number of sector areas. Reference numerals 1, 2, 3, ---, n indicate sector areas, corresponding to the grooves 51 shown in FIG. 3, which are the areas to and from which the signals are recorded or produced. FIG. 9 shows a practical example in the case where the signals are recorded, reproduced and erased on the disc which has been preliminarily formated in this way.

In FIG. 9, the signals recorded on the optical disc are reproduced by the light spot L and outputted from the terminal PB in the optical recording and reproducing apparatus of FIG. 4, and these signals are delivered to the terminal PB of FIG. 9. A reproducing register 201 reads out the track address and the sector addresses $A_1$, $A_2$, ---, $A_n$ of the disc shown in FIG. 8 and temporarily stores them, and then outputs the same. A controller 200 constituted by a microcomputer or the like, serves to control each section of the optical recording and reproducing apparatus. Only the part of the operations which is necessary to explain the present invention will be described here. For example, a case will be described where the signal which has been preliminarily recorded in the second sector of the (i)th track in the format of FIG. 8 is to be erased by the recording and reproducing apparatus. First, the controller 200 sets the address $A_{2i}$ of the second sector of the (i)th track on a setting register 204, and at the same time it sets an erasing mode register 206 and outputs a high-level signal on a line q. In response to this signal, the light spot L of FIG. 4 hunts the (i)th track of the disc, reads out the address signals $A_{1i}$, $A_{2i}$, --- on its track, stores its content in the reproducing register 201, and outputs the contents to a coincidence detection circuit 203. A sector detection circuit 202 detects a change of the content of the reproducing register 201 and generates a pulse to a line i whenever the light spot L passes through a new sector. The controller detects this signal and manages the number of sectors on which thelight spot L passed. When the light spot 1 passes on the (i)th track $A_{2i}$ of FIG. 8, $A_{2i}$ is set on the reproducing register 201. At this time a coincidence signal is generated to an output line j of the coincidence detection circuit 203. This signal serves to set an erasing interval flip flop 205, so that a high-level signal is outputted to a line p. An AND gate 207 generates at its terminal ER an output signal for allowing the erasing semiconductor laser to emit the light since both lines p and q are at high level. The light spot M of FIG. 4 is emitted accordingly for a necessary period of time. When the controller 200 receives the coincidence detection signal on the line j, it monitors the number of sectors on which the lightspot on the line i passes. When the lightspot passes a predetermined number of sectors, the controller 200 generates outputs on lines k and R to reset the erasing interval flip-flop 205 and erasing mode register 206, thereby stopping the irradiation by the erasing light. In this manner, as shown in FIG. 4, the circular micro-lightspot L and the elliptic lightspot M which is long along the track are formed on the same guide groove (track), and the section to be erased on the disc is detected and fixed by the circular spot L and the signal recorded in the relevant section can be erased by the elliptic light spot M. In FIG. 7, the moving direction of the disc and the arrangement of the lightspots L and m are not limited to those shown in this drawing. For example, the lightspot L may overlap the light spot M, and the order of L and M may be reversed. These problems can be solved by processing the timing of detecting of the coincidence and of the timing of emitting the erasing light in FIG. 9, and of the data format to be recorded on the disc. In addition, it is possible to make the condition for temperature elevation and slow-cooling broader than the condition in the cases where only the lightspot M is emitted if the intensity of the lightspot L is increased to a degree more than the intensity of the reproducing light by the signal at the terminal ER of FIG. 9 and at the same time the lightspot M is also emitted.

Namely, it may be possible to use the first and second lightspots which are almost circular and to closely arrange these spots such that they cooperate to form a single almost elliptic spot on the same track.

As described above, according to the present invention, signals can be recorded and reproduced by the almost circular micro-lightspot, and the signals which have been preliminarily recorded can be erased by the light spot which is elliptic along the guide track or by cooperation of the above-mentioned circular light spot and the above mentioned elliptic light spot; thus, the function of the conventional optical recording and reproducing apparatus of the write-once type can be further enhanced.

We claim:

1. An apparatus for optically and reversibly recording and reproducing signals by applying micro-lightspots on an optical recording medium which uses a thin recording film made of optical recording material which can reversibly change its optical characteristic between its amorphous state and its crystal state as a result of light being irradiated on said thin film, said film being formed on a substrate having optical guide tracks, said apparatus comprising:

two light source means for respectively applying light beams having different wavelengths; and optical means for respectively converging the applied light beams so as to obtain a first substantially circular micro-lightspot and a second elliptic lightspot having a major diameter in the tangential direction of said optical guide track on one and the same optical guide track, the condition for temperature elevation and rapid cooling being provided for said optical recording medium by said first almost circular lightspot, and the condition for temperature elevation and slow-cooling being provided for said optical recording medium by said second elliptic light spot solely or by cooperation of said second elliptic light spot and said first almost circular light spot.

2. An optical and reversible recording and reproducing apparatus according to claim 1, wherein signals are recorded on and reproduced from said optical recording medium by said first substantially circular light spot, and wherein the signals recorded on said medium are erased by said second elliptic light spot solely or by cooperation of said elliptic light spot and said almost circular light spot.

3. An optical and reversible recording and reproducing apparatus according to claim 2, wherein servo signals necessary to record and reproduce signals on and from said optical recording medium are obtained by said first almost circular light spot.

4. An optical and reversible recording and reproducing apparatus according to claim 1, further comprising means for fixing a section to be erased on said optical recording disc on the basis of the signals reproduced from said optical recording disc by said first almost circular lightspot, and means for generating and applying an erasing light for a necessary period of time on the basis of said fixed signal.

5. An optical and reversible recording and reproducing apparatus according to claim 1, wherein said two light source means are laser light source means.

* * * * *